United States Patent [19]

Suzuki

[11] 4,331,219

[45] May 25, 1982

[54] MECHANICAL SAFETY DEVICE FOR A LIFT

[75] Inventor: Yasunori Suzuki, Fujinomiya, Japan

[73] Assignee: Yasui Sangyo Co., Ltd., Japan

[21] Appl. No.: 149,025

[22] Filed: May 12, 1980

[30] Foreign Application Priority Data

May 14, 1979 [JP] Japan .................................. 54-58985

[51] Int. Cl.[3] .............................................. B60S 13/00

[52] U.S. Cl. ....................................... 187/8.5; 187/82; 254/4 R

[58] Field of Search .................... 187/8.67, 8.47, 8.49, 187/8.41, 8.5, 20, 81, 82, 84; 254/2 C, 4 R, 4 C, 93 R, 93 L

[56] References Cited

U.S. PATENT DOCUMENTS

| | | | |
|---|---|---|---|
| 706,644 | 8/1902 | Edwards | 187/82 |
| 743,258 | 11/1903 | Dolbey | 187/82 |
| 884,908 | 4/1908 | Dorsey | 187/82 |
| 931,211 | 8/1909 | Moulton | 187/82 |
| 948,175 | 2/1910 | Kantor | 187/84 |
| 1,171,243 | 2/1916 | Prokop | 187/84 |

*Primary Examiner*—Robert J. Spar
*Assistant Examiner*—Kenneth Noland
*Attorney, Agent, or Firm*—John Cyril Malloy

[57] ABSTRACT

A mechanical safety device for a lift which comprises a pillar and a carriage having arms for supporting a load, the carriage being moved up and down the pillar by a chain, wherein a pawl pivotally mounted to the carriage is adapted to be pivoted into a latch position wherein it engages with one of slots of a longitudinal slot plate mounted to the pillar, so as to prevent the carriage from filling down, and an unlatch position wherein it does not engage with the slot, and is biased to the latch position by a spring, wherein a lock lever pivotally mounted to the carriage is adapted to be pivoted into an engage position wherein it locks an action plate connected to the pawl in the unlatch position, and a disengage position wherein it unlocks the action plate in the latch position, and is biased to the engage position by a spring, and wherein a push device which is movably mounted to the carriage and is coupled to one end of the chain, pushes the lock lever so that the lock lever may be pivoted into the disengage position when the chain breaks, thereby locking the carriage by the pawl.

4 Claims, 5 Drawing Figures

MECHANICAL SAFETY DEVICE FOR A LIFT

BACKGROUND OF THE INVENTION

The present invention relates to a mechanical safety device for a lift in which a carriage for supporting a load is hoisted up and down a vertical hollow mast by a cable or a chain therein, and more particularly relates to a mechanical safety device designed to prevent automatically the carriage from falling down, in the event of breakage of the cable or the chain which supports the carriage.

Many lifts have been proposed and practiced in which a carriage is moved up and down a mast. For example, two-masted lifts in which two pillars are provided, with a carriage moving up and down each of the masts, each of the carriages having two arms which extend inwards, and which support a vehicle from its opposite sides so as to lift it up when the carriages are raised, are widely known. Further, it is well-known to raise at least one of the carriages up its mast by a cable attached to the carriage. Also it is well-known to provide two cables of this kind running together in parallel for the sake of safety.

The dangers inherent in these lifts are also well-known. If the supporting cable or cables should break, a very serious accident is likely. For this reason various safety devices have been proposed for lifts. As a type of safety device is known a claw which, if the support cable breaks, engages in one of a number of vertical slots cut in the support pillar. Alternatively, the slots may be provided as in a rack which is attached to the pillar. However, with these conventional types of safety devices, there is the disadvantage that when the cable breaks the claw may be midway between one slot and the next, and therefore the carriage and load will inevitably fall a certain distance before the claw engages in a lower slot. Therefore a considerable shock is caused when the claw engages, and this may either break part of the safety mechanism or, perhaps, may dislodge the load from off the carriage, and cause a further accident.

In order to remove this defect, another safety device has been proposed which is attached to the carriage and which, when the cable which supports the carriage becomes slack, locks the carriage immediately to a smooth vertical rod, without allowing it to descend any substantial distance. Further, by its construction, if the carriage is supported by two cables in parallel, this device will only operate when both the cables become slack, and therefore the carriage is otherwise unsupported.

Further, a cable break detector has also been proposed, which is attached to the mast and sounds an alarm when the cable breaks so that people who were working in a position to be endangered by the falling of the load supported by the lift should be able to get clear of it.

However, such conventional safety devices, when no electric power is supplied due to a carelessness, or an electricity failure or a trouble of the electric device, may not work any more, which means the lack of reliability and stability. In addition, most of conventional safety devices are operated manually and are high cost.

SUMMARY OF THE INVENTION

Therefore, it is an object of the present invention to provide a mechanical safety device for a lift which comprises a pillar and a carriage having arms for supporting a load, which is moved up and down the pillar by a chain, free from the aforementioned defects, which is stable and reliable.

According to the present invention there is provided a mechanical safety device for a lift which comprises a pillar and a carriage having arms for supporting a load, which is moved up and down the pillar by a chain, comprising (a) a longitudinal slot plate having a row of slots formed in its longitudinal direction, which is mounted to the pillar, (b) a pawl pivotally mounted to the carriage, which is adapted to be pivoted into a latch position wherein it engages with one of the slots so as to prevent the carriage from falling down and an unlatch position wherein it does not engage with the slot, and which is biased to the latch position by a spring, (c) an action plate connected to the pawl so as to be pivoted together therewith, (d) a lock lever pivotally mounted to the carriage, which is adapted to be pivoted into an engage position wherein it locks the action plate when the pawl is in the unlatch position and a disengage position wherein it unlocks the action plate when the pawl is in the latch position, and which is biased to the engage position by a spring, and (e) a push means which is movably mounted to the carriage, and is coupled to one end of the chain, and which is adapted to push the lock lever so that the lock lever may be pivoted into the disengage position when the chain breaks.

BRIEF DESCRIPTION OF DRAWINGS

In order that the present invention may be better understood, a preferred embodiment thereof will be described with reference to the accompanying drawings, in which.

DETAILED DESCRIPTION OF A PREFERRED EMBODIMENT

Figure 1:
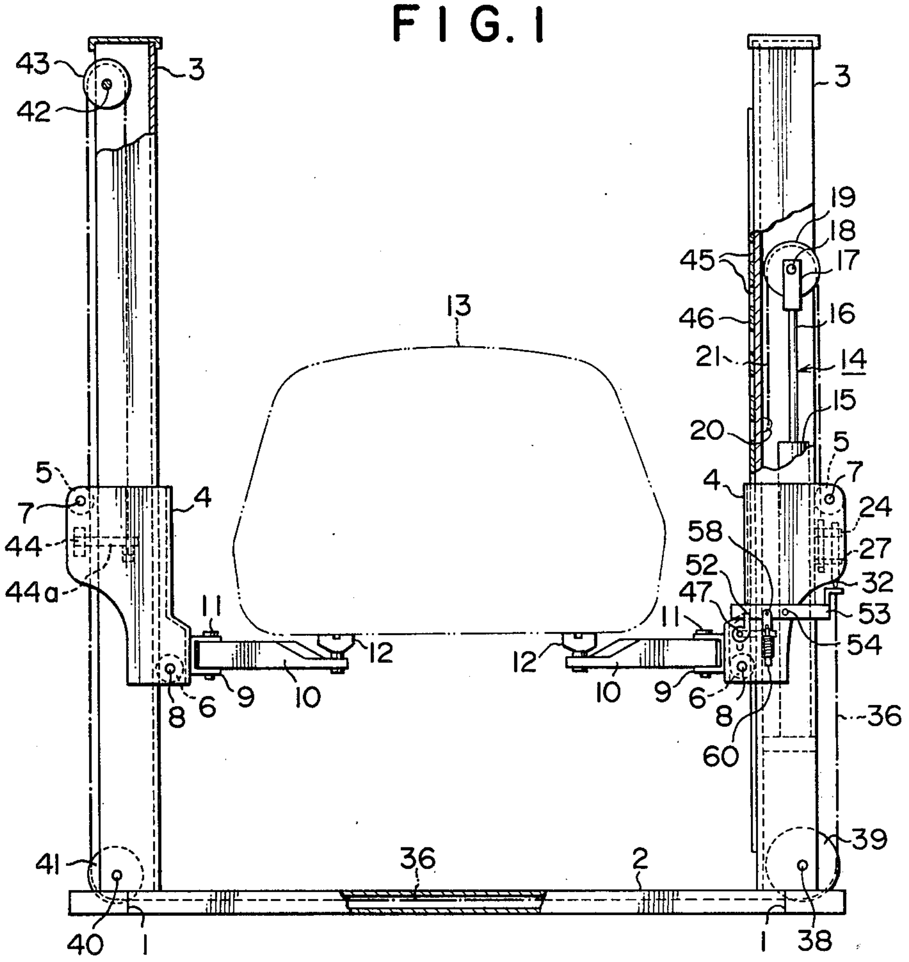
FIG. 1 is a front view, partly cut away, of a two-pillar lift provided with a safety device according to the present invention, whereby a load shown by a two-dotted line is lifted in a certain height.
Figure 2:
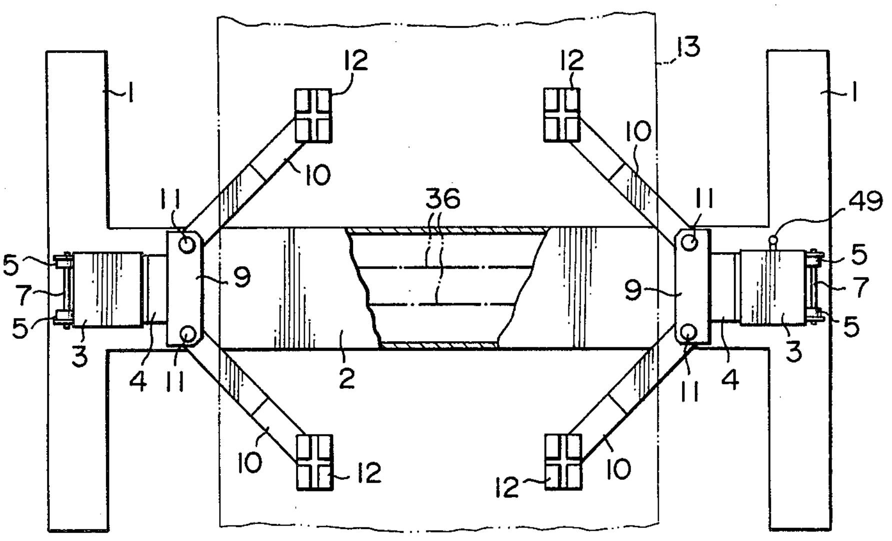
FIG. 2 is a top plan view of FIG. 1.

Referring now to the drawings there is shown in FIGS. 1 and 2 a two-pillar lift to which is fitted a safety device according to the present invention.

A hollow base 2 is provided at its right and left hand ends with legs 1 extending to front and rear. On the base 2 two support pillars 3, one at the left and one at the right, whose horizontal cross-sections are outward-facing U-shapes. To each of these pillars 3 is mounted a carriage 4 which is adapted to slide up and down the pillar. Each carriage 4, like the pillar 3, of a horizontal cross-section which is of an outward-facing U-shape.

On the carriage 4 are mounted, at the upper outer corners, rollers 5, and at the inner lower corners, rollers 6. The rollers 5 are mounted rotatably on horizontal shafts 7 running from front to rear, and the rollers 6 are similarly mounted on horizontal shafts 8 running from front to rear. By these rollers 5 and 6, which roll on the outer and the inner surfaces of the pillars 3, the carriages 4 run lightly and easily up and down the pillars 3.

To the front and the rear sides of each carriage 4 are fixed brackets 9 whose vertical cross-sections are inward facing U-shapes. To these brackets 9 are pivoted arms 10 which extend horizontally inwards, by vertical shafts 11, in such a way that the arms 10 can swing from side to side. Each of the arms 10 is formed of two telescoping sections, so that its free end can be moved in and out. On the upper surface of the free ends of the arms 10 are mounted bearing members 12 which are free to turn about vertical pivot axes.

Thus, by spreading the arms 10 in forward and rearward directions, and by telescoping them out and inserting their bearing members 12 under the sides of a vehicle 13 which constitutes the load for the lift, and then by raising the two carriages 4, the load can be lifted up into the desired position.

In the lift illustrated, the raising and the lowering of the carriages 4 is carried out by a piston-cylinder type expansion device 14 within the right hand pillar 3. In this expansion device 14 a piston 16 projects from the upper portion of a cylinder 15 and at the top of the piston 16 is fixed a fork-shaped trunnion 17. A pulley 19 is mounted to be freely rotatable on a horizontal shaft 18 mounted in the front to rear orientation in the trunnion 17.

Figure 3:
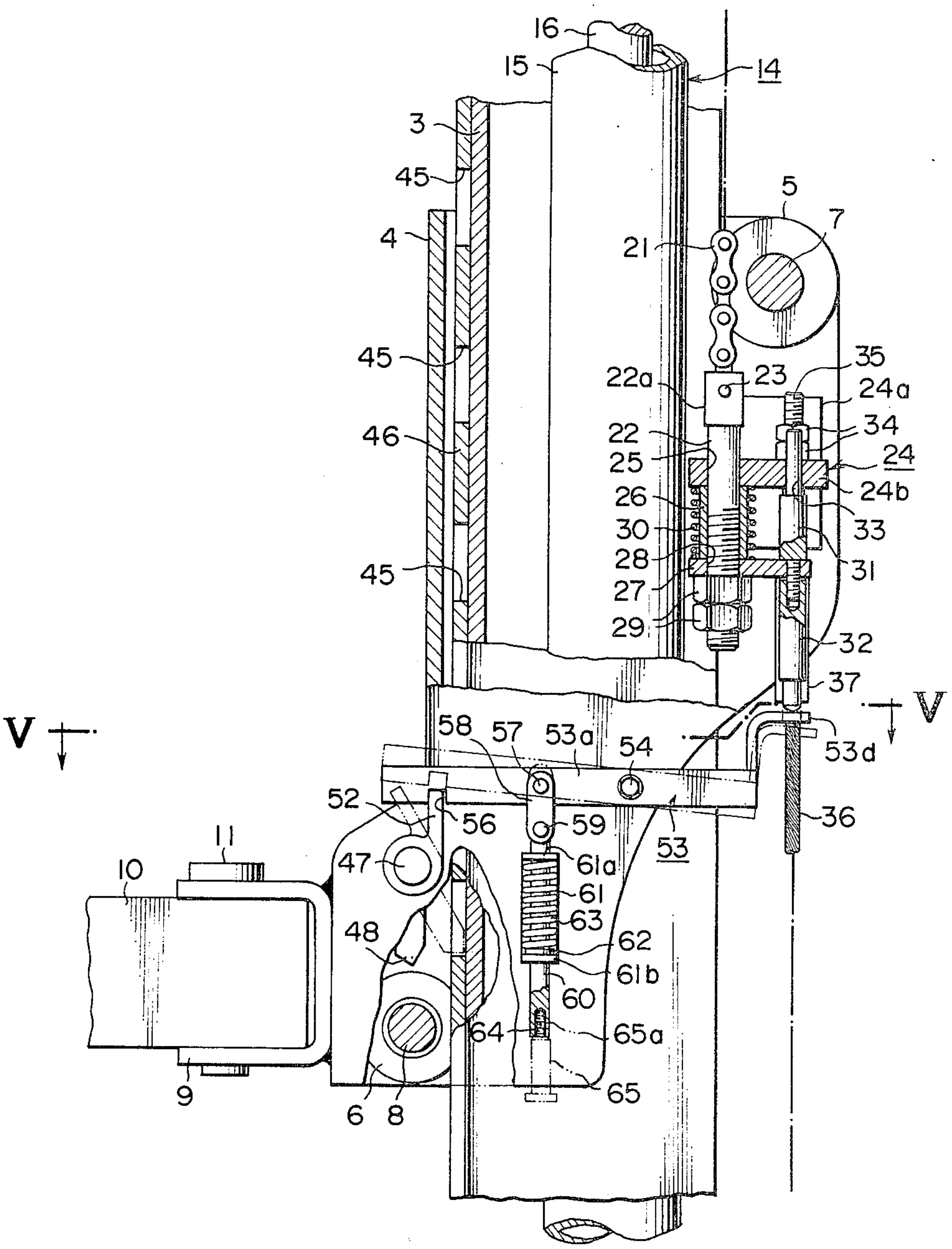
FIG. 3 is an enlarged front view, partly broken, of a carriage shown in the right hand side in FIG. 1.

A pair of chains 21, one ends of which are fixed to fixtures 20 secured to the pillar 3 in its intermediate level, pass over the pulley 19, and their other ends are fixed to a fork-like top **22*a* of a vertical suspension rod 22 having a lower screw portion by a horizontal shaft 23, as shown in FIG. 3**.

Figure 4:
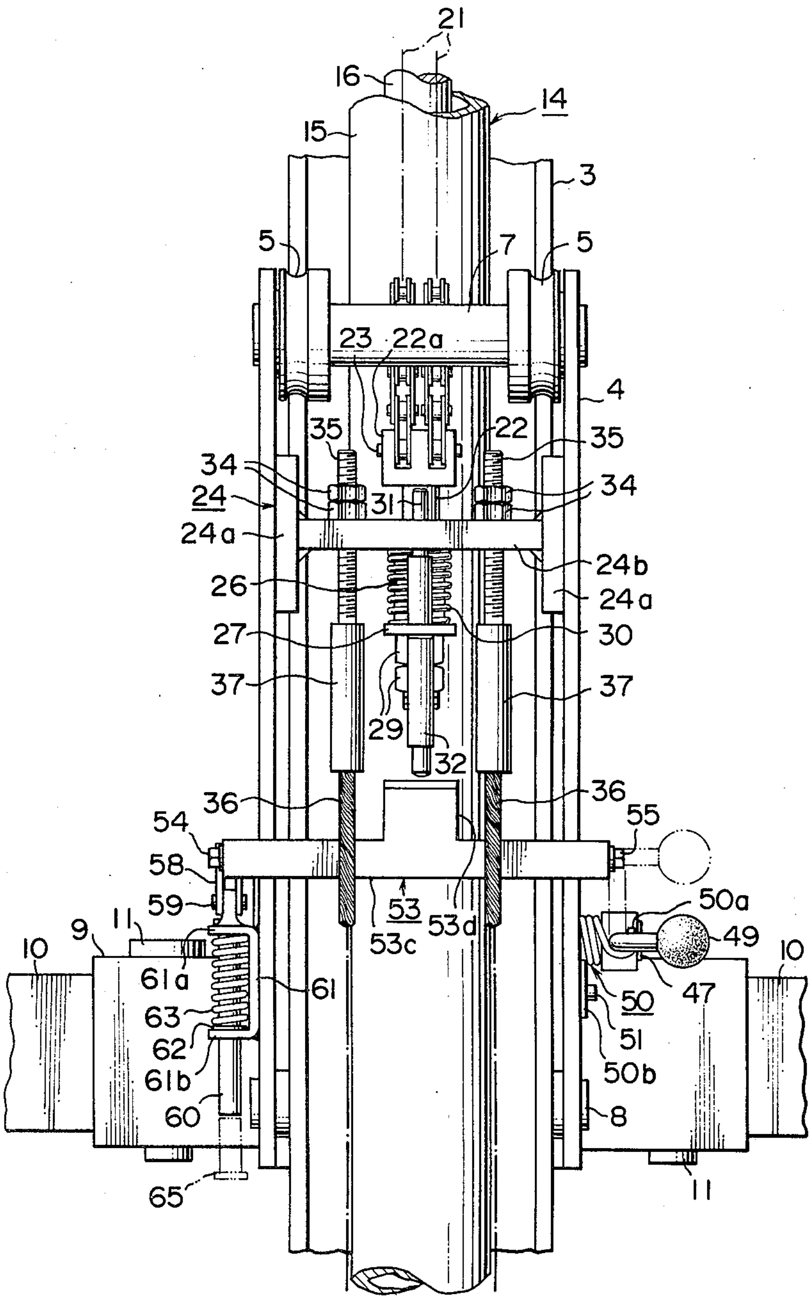
FIG. 4 is a right side view of FIG. 3.
Figure 5:
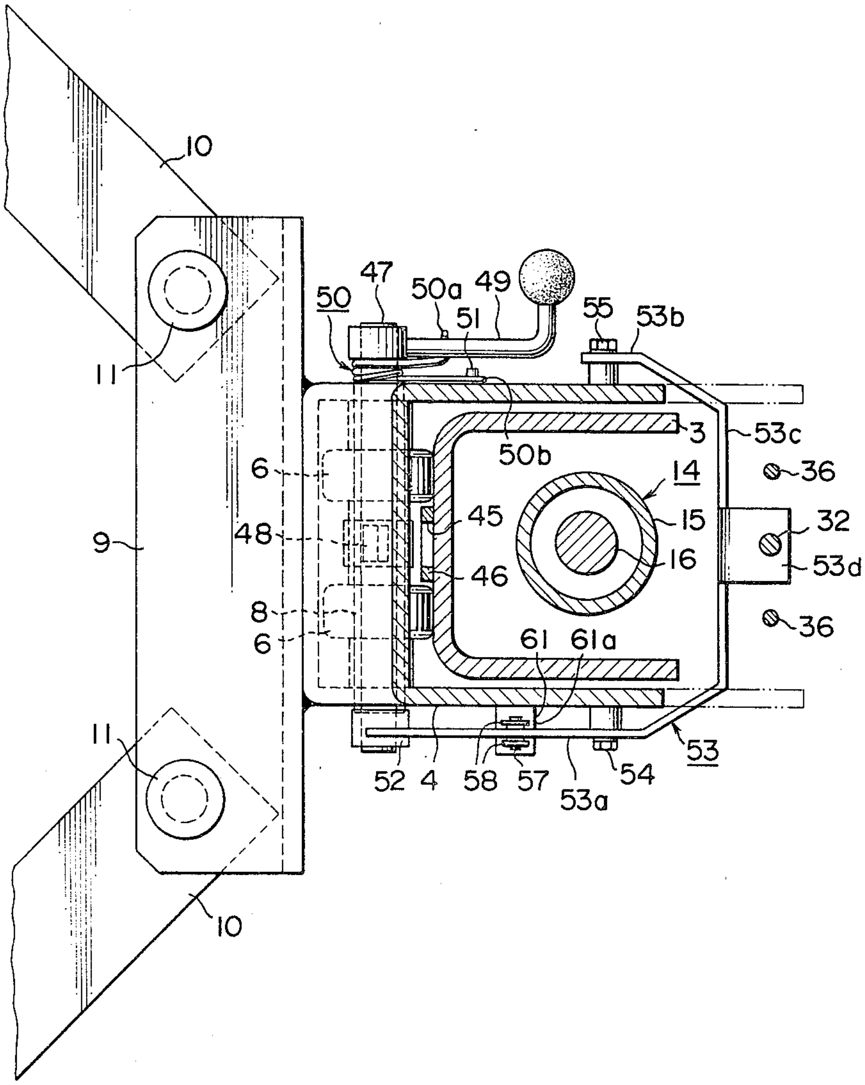
FIG. 5 is a transverse cross section, taken along the line V—V in FIG. 3.

As shown in FIGS. 3–5, a H-shaped block 24 comprises two vertical side plates **24*a* and a horizontal plate 24*b*, and is mounted to the carriage 4 within its outward side portion via the vertical side plates 24*a*. The rod 22 is inserted into a vertical hole 25 formed in the inner side portion of the horizontal plate 24*b*. In the lower portion of the rod 22 are inserted a spacing collar 26 and a hole 28 of a horizontal stop plate 27, and double nuts 29 are engaged with the lower end of the rod 22 in order to prevent the stop plate 27** from falling off.

On the collar 26 is fitted a coil spring 30 between the horizontal plate **24*b* of the H-shaped block 24 and the horizontal stop plate 27, so that the horizontal stop plate 27** may be biased downwards.

In the outer end of the stop plate 27 a guide pin 31 and a push rod 32 are engaged with each other so as to extend upward and downward, respectively, from the stop plate 27 along a vertical line. The top of the guide pin 31 projects slidably beyond the horizontal plate **24*b* of the H-shaped block 24 through a guide hole 33** formed therein.

Thus, as the piston 16 moved in and out of the expansion device 14, the chains 21 raise and lower the carriage 4 along the pillar 3. When both the chains 21 break, the combination of the rod 22, the stop plate 27, the guide pin 31 and the push rod 32 are rushed downward by the coil spring 30 away from the horizontal plate **24*b* of the block 24, and thereby the bottom of the push rod 32 pushing down a L-shaped upper projection 53*d* of a lock lever 53** hereinafter described.

The raising and lowering of the left hand carriage 4 is performed by its being linked to the right hand carriage 4. A pair of wires or similar cables 36 are provided in parallel for the sake of safety. One ends of the cables 22 are attached to screw rods 35 via connectors 37, each screw rod 35 being mounted to the horizontal plate **24*b* of the H-shaped block 24 by double nuts 34**.

Each of the cables 22 then passes around a guide pulley 39 pivotally attached to a pivot shaft 38 in the lower end of the right hand pillar 3, through the inside of the hollow base 2, around a guide pulley 41 pivotally attached to a pivot shaft 40 in the lower end of the left hand pillar 3, up the outside of the left hand pillar 3, and over a guide pulley 43 pivoted on a pivot shaft 42 at the top end of the left hand pillar 3, from which it descends vertically to the carriage 4. On the carriage 4 the ends of the two cables 22 are attached to a free end of a horizontal member **44*a* of a block 44 secured to the left hand pillar 3, as shown in FIG. 1. By these connecting cables 22 the left hand carriage 4 is moved up and down its pillar 3 by exactly the same amount as is the right hand carriage 4**.

The present invention consists in the provision of a safety device which guards against the possibility of both the cables snapping. The construction of this device is best seen in FIGS. 3–5.

A longitudinal slot plate 46 having a row of slots formed therein in the longitudinal direction is attached to the central inner side of the right side pillar 3.

Above the shaft 8 for the roller 6 in the right hand carriage 4, a horizontal lock shaft 47 is pivotally mounted through the side plates of the carriage 4.

A lock pawl 48 is secured to the center of the lock shaft 47 perpendicular thereto. Thus, the pawl 48 is pivoted together with the lock shaft 47 so as to direct just downward when it is positioned in the unlatch position, as shown by a solid line in FIG. 3, or so that its free end may engage with one of the slots 45 of the slot plate 46 when it is positioned in the latch position, as shown by a two-dotted line in FIG. 3.

To one outer end of the lock shaft 47 is fixed a hand lever 49 extending outward, and a coil spring 50 which biases the pawl 48 to the latch position is fitted on the one end of the lock shaft 47 between the hand lever 49 and the side plate of the carriage 4. One end **50*a* of the coil spring 50 is engaged with the hand lever 49 and the other end 50*b* of the same is fixed to a stop pin 51 attached to the side plate of the carriage 4. The hand lever 49 shown by solid lines in FIG. 4** is positioned in the unlatch position and the same shown by two-dotted lines is positioned in the latch position.

To the other end of the lock shaft 47 is attached an action plate 52 which may direct just upward when the pawl 48 is positioned in the unlatch position, as shown by a solid line in FIG. 3, or be inclined innerward when the pawl 48 is positioned in the latch position, as shown by a two-dotted line in FIG. 3.

The lock lever 53 positioned under the right hand carriage 4 is pivotally mounted to the side plates of the carriage 4 by a pair of pivot shafts 54 and 55, and comprises a free inner portion **53*a*, a short side portion 53*b*, an outer portion 53*c* coupling the two portions 53*a* and 53*b* and the L-shaped upper projection 53*d* projecting upper outside, attached to the center of the outer portion 53*c***.

The free inner portion **53*a* is provided with a groove 56 in its free end, which the top of the action plate 52 is engaged with when the pawl 48 is positioned in the unlatch position, as shown by solid lines in FIG. 3. The upper projection 53*d* of the lock lever 53 is positioned just below the push rod 32 so as to be pushed down thereby, in the event of breakage of the chains 21**, as hereinbefore mentioned.

The free inner portion **53*a* of the lock lever 53 is pivotally connected to upper ends of link members 58 by a link pin 57 between the pivot shaft 54 and the groove 56. The lower ends of the link members 58 are linked to the top end of a vertical rod 60 by a link pin 59. The rod 60 extends downward through upper and lower end plates 61***a* and 61*b* of a U-shaped coil spring holder 61, and is provided with a stop frange 62 which is adapted to contact with the upper surface of the lower end plate 61*b* of the holder 61 when the top of the action plate 52 is engaged with the groove 56 of the lock lever 53 in the unlatch position.

A coil spring 63 biased is fitted on the rod 60 between the upper end plate 61*a* and the stop flange 62 in the holder 61. Hence, the coil spring 63 biases the free innter portion 53*a* or the lock lever 53 downward.

Therefore, when the upper projection 53*d* of the lock lever 53 is pushed down by the push rod 32 in the event of breakage of the chains 21 by an accident, the lock lever 53 is pivoted clockwise against the coil spring 63 in the holder 61, resulting in disengaging the action plate 52 from the groove 56 of the lock lever 53, and then the lock shaft 47 is pivoted counterclockwise by means of the coil spring 50, thereby allowing the pawl 48 into the latch position, i.e. engaging the pawl 48 with the slot 45 of the slot plate 46 so as to prevent the carriage 4 from filling down.

On the other hand, the pawl 48 is pivoted from the latch position to the unlatch position, that is, it is disengaged from the slot 45 of the slot plate 46 by pivoting the lock shaft 47 by pushing down the hand lever 49 manually against the coil spring 50 until the action plate 52 is engaged with the groove 56 of the lock lever 53.

The rod 60 is further provided with a screwed hole 64 in its bottom. A supplemental rod 65 having a screw head 65*a* is connected to the bottom of the rod 60 by engaging the screw head 65*a* with the screwed hole 64, as shown by two-dotted lines in FIG. 3.

The length of the supplemental rod 65 is so determined that, when the action plate 52 is engaged with the groove 56 of the lock lever 53, or the stop flange 62 of the rod 60 is contact with the lower end plate 61*b* of the holder 61, the bottom of the supplemental rod 65 may project somewhat below the bottom level of the carriage 4. Consequently, when the carriage 4 is lowered to the bottom, the supplemental rod 65 is pushed up against the coil spring 63 by the base 2, thereby pivoting the lock lever 53 into the latch position, as described above. If the supplemental rod 65 is not used, the carriage 4 is not locked by the pawl 48 even when it is lowered onto the bottom.

The left hand carriage 4 may also be provided with the safety device of the present invention described above.

In the embodiment described above, when the supplemental rod 65 is connected to the rod 60, as the carriage 4 is raised from the bottom, the pawl 48 is maintained in the latch position. Then, the pawl 48 slides up in contact with the slot plate 46 by means of the coil spring 50. However, when the carriage 4 is lowered, the pawl 48 must be pivoted into the unlatch position by the hand lever 49.

Although the present invention has been shown and described with respect to a preferred embodiment thereof, it should be understood that various changes and modifications of the form and the detail thereof could be made therein by a person skilled in the art without departing from the scope of the present invention.

What is claimed is:

1. A mechanical safety device for a lift which comprises a pillar means, supported by a base and a carriage means having arms for supporting a load, means to move the carriage means up and down the pillar including a chain, comprising:

(a) a longitudinal slot plate having a row of slots formed in its longitudinal direction, which is mounted to the pillar means;

(b) a pawl pivotally mounted to the carriage, which is adapted to be pivoted into a latch position wherein it engages with one of the slots so as to prevent the carriage from falling down and an unlatch position wherein it does not engage with the slot, and spring means biasing the pawl normally into latch position by a spring;

(c) an action plate connected to the pawl so as to be pivoted together therewith;

(d) a lock lever pivotally mounted to the carriage, which is adapted to be pivoted into an engage position wherein it locks the action plate when the pawl is in the unlatch position and a disengage position wherein it unlocks the action plate when the pawl is in the latch position, and spring means normally biasing the lock lever into the engage position; and (e) a push means which is movably mounted to the carriage means, and is coupled to one end of the chain, and which is adapted to push the lock lever so that the lock lever may be pivoted into the disengage position when the chain breaks, said device further comprising means removably positioned between said lock lever spring means and said base which functions to pivot the lock lever into the disengaged position when the carriage is lowered and said means engages the base.

2. A device as defined in claim 1, wherein the push means comprises a push rod and a spring which receives the load of the carriage and biases the push rod so that the push rod may push the lock lever when the chain breaks.

3. A mechanical safety device for a lift which comprises a pillar means and a carriage means having arms for supporting a load, means to move the carriage means up and down the pillar including a chain, comprising:

(a) a longitudinal slot plate having a row of slots formed in its longitudinal direction, which is mounted to the pillar means;

(b) a pawl pivotally mounted to the carriage, which is adapted to be pivoted into a latch position wherein it engages with one of the slots so as to prevent the carriage from falling down and an unlatch position wherein it does not engage with the slot, and spring means biasing the pawl normally into latch position by a spring;

(c) an action plate connected to the pawl so as to be pivoted together therewith;

(d) a lock lever pivotally mounted to the carriage, which is adapted to be pivoted into an engage position wherein it locks the action plate when the pawl is in the unlatch position and a disengage position wherein it unlocks the action plate when the pawl is in the latch position, and spring means normally biasing the lock lever into the engage position;

(e) a push means which is movably mounted to the carriage means, and is coupled to one end of the chain, and which is adapted to push the lock lever so that the lock lever may be pivoted into the disengage position when the chain breaks;

(f) said push means comprises a push rod and a spring which receives the load of the carriage and biases the push rod so that the push rod may push the lock lever when the chain breaks; and said device further comprising a rod which is movably up and down mounted longitudinally to the carriage means and whose bottom projects somewhat downwardly below the bottom level of the carriage means, so that, when the carriage means is lowered to the bottom, the rod may be pushed up so as to pivot the lock lever into the disengage position.

4. A device as defined in claim 3, wherein the rod comprises a upper main part and a lower supplemental part which is detachable from the main part.

* * * * *